UNITED STATES PATENT OFFICE.

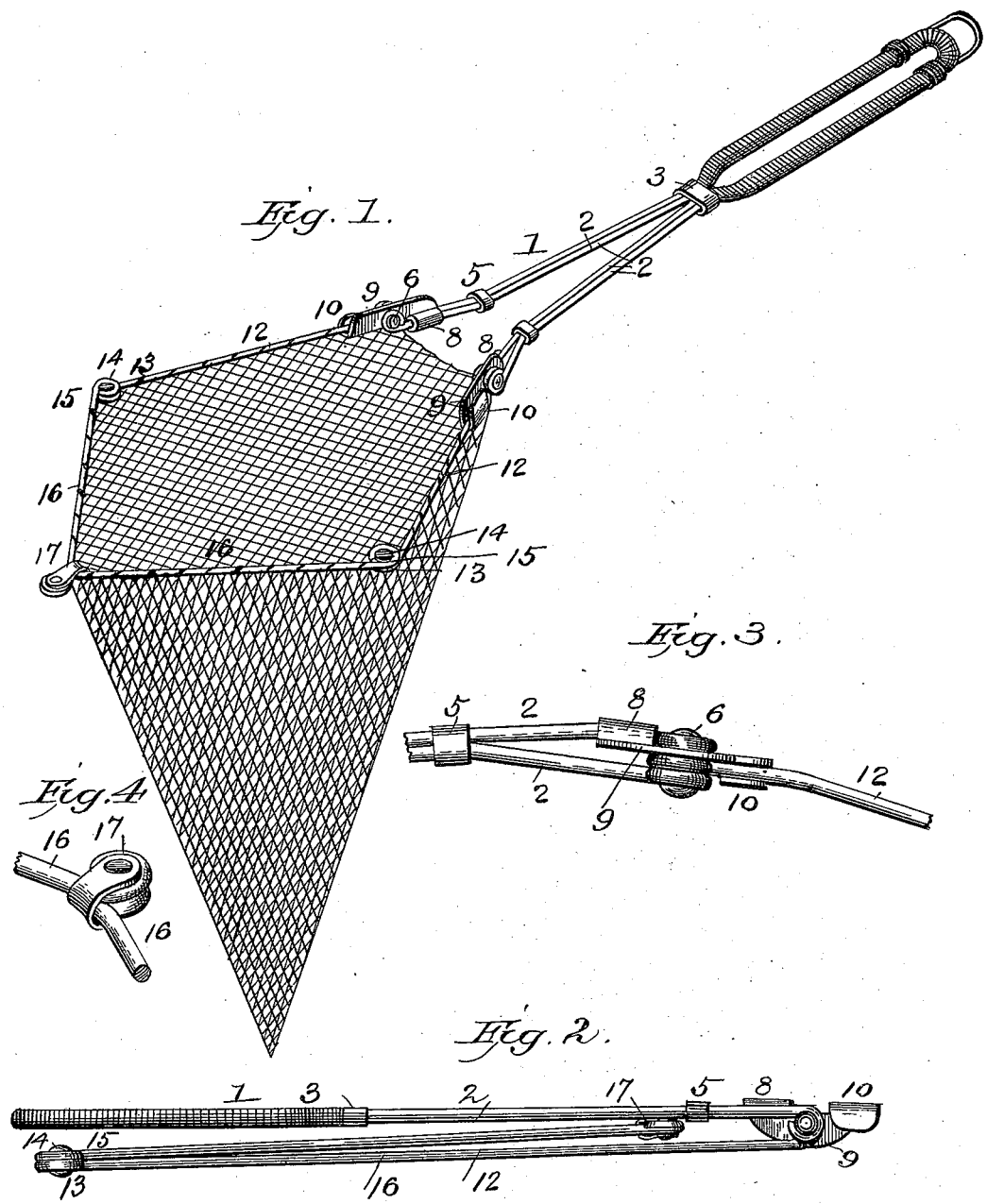

CHARLES F. LARZELERE, OF AUBURN, NEW YORK, ASSIGNOR OF ONE-HALF TO JAMES W. RACE, OF SAME PLACE.

FISHING-NET.

SPECIFICATION forming part of Letters Patent No. 550,514, dated November 26, 1895.

Application filed June 14, 1895. Serial No. 552,773. (No model.)

*To all whom it may concern:*

Be it known that I, CHARLES F. LARZELERE, a citizen of the United States, and a resident of Auburn, in the county of Cayuga and State of New York, have invented certain new and useful Improvements in Fishing-Nets; and I do hereby declare that the following is a full, clear, and exact description of the invention, which will enable others skilled in the art to which it appertains to make and use the same, reference being had to the accompanying drawings, which form a part of this specification.

My invention relates to improvements in collapsible landing or dip nets, and its object is to provide an improved construction of the same, whereby the net can be folded up when not in use, so as to occupy but little space, thus rendering it very convenient to be transported from place to place.

The invention consists in the novel construction and combination of parts hereinafter fully described and claimed.

In the accompanying drawings, Figure 1 is a perspective view of the collapsible frame of the net extended or ready for use, and also showing a portion of the net. Fig. 2 is a view of the frame folded up as when not in use. Figs. 3 and 4 are detail perspective views of the joints of the arms.

In the said drawings, the reference-numeral 1 designates the handles of the net, consisting of two pieces of stiff wire bent over at their centers, forming parallel arms 2 2. Intermediate their ends the two sets of wires are clamped together by means of a collar 3, and from this point to the outer ends each pair of wires are separated somewhat and covered or wound with cord, string, or other material. Near the inner ends the wires of each pair are clamped together by means of collars 5, and the inner ends or extremities of the wires are bent or coiled into loops 6, which are connected by pivot-pins 7. Secured to the inner ends of the inner wire are sleeves 8, having formed integral therewith plates 9, provided with apertures therein through which the pivot-pins pass, and the inner ends of said plates are formed with lips or lugs 10, which are bent upwardly, forming stops for the arms 12. These arms 12, which consist of stiff wire, have their inner ends bent into loops, which engage with the pivot-pins. The outer ends of said arms 12 are bent into eyes or loops 13, which engage with pins 14, which in turn are engaged by loops 15 on the inner ends of arms 16, the opposite ends of which are pivotally connected together in a similar manner. Connected with the pivots of said arms are curved strips 17, which are adapted to be engaged by the arms 16 as they are expanded and serve as stops to limit the movement thereof.

The operation will be readily understood. When the net is not in use, the parts will occupy the position shown in Fig. 2. To expand the frame the handles are unfolded, which will cause the arms 12 to be spread apart. The arms 16 are then pushed outward, so that they will assume an approximately-rectangular shape. The netting may be of any ordinary or suitable construction.

Having thus fully described my invention, what I claim is—

1. In a landing or dip net, the combination with the handle consisting of the bent wires arranged in pairs, the sleeves at the inner ends thereof, the plates secured thereto formed with bent lips or lugs, of the arms pivotally connected with said wires and the arms pivotally connected therewith and with each other; substantially as described.

2. In a landing or dip net, the combination with the handles consisting of the bent wires arranged in pairs, the sleeves secured to the inner ends thereof and provided with plates having bent lugs or lips forming stops, the arms pivotally connected with said handles, the arms pivoted thereto and to each other, the pivot pins and the bent strips secured to the pivots of said arms, substantially as described.

In testimony that I claim the foregoing as my own I have hereunto affixed my signature in presence of two witnesses.

CHARLES F. LARZELERE.

Witnesses:
   DANIEL EMBODY,
   H. CLAY FITZWATER.